United States Patent
Stammers

(10) Patent No.: US 11,627,511 B2
(45) Date of Patent: Apr. 11, 2023

(54) TECHNIQUES TO FACILITATE DATA STREAM ROUTING AND ENTITLEMENT

(71) Applicant: Cisco Technology, Inc., San Jose, CA (US)

(72) Inventor: Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/952,253

(22) Filed: Nov. 19, 2020

(65) Prior Publication Data

US 2022/0159538 A1    May 19, 2022

(51) Int. Cl.
*H04W 36/30* (2009.01)
*H04W 76/18* (2018.01)
*H04W 76/15* (2018.01)
*H04L 45/74* (2022.01)

(52) U.S. Cl.
CPC ............ *H04W 36/30* (2013.01); *H04L 45/74* (2013.01); *H04W 76/15* (2018.02); *H04W 76/18* (2018.02)

(58) Field of Classification Search
CPC ..... H04W 36/30; H04W 76/15; H04W 76/18; H04L 45/74
See application file for complete search history.

(56) References Cited

U.S. PATENT DOCUMENTS

| 2017/0048739 | A1 | 2/2017 | Jeong et al. |
| 2019/0200174 | A1 | 6/2019 | Shaw et al. |
| 2020/0008072 | A1 | 1/2020 | Cui et al. |
| 2020/0178196 | A1 | 6/2020 | Wang et al. |
| 2020/0259896 | A1 | 8/2020 | Sachs et al. |
| 2021/0114616 | A1* | 4/2021 | Altman ................. H04W 8/205 |
| 2021/0135896 | A1* | 5/2021 | Ghanaie-Sichanie ...................... H04N 21/64738 |
| 2021/0160183 | A1* | 5/2021 | Mindler ................. H04L 43/08 |
| 2021/0333769 | A1* | 10/2021 | Shah ................. G06K 19/0723 |
| 2021/0377817 | A1* | 12/2021 | Lu ...................... H04W 36/0022 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.

* cited by examiner

*Primary Examiner* — Charles N Appiah
*Assistant Examiner* — Frank E Donado
(74) *Attorney, Agent, or Firm* — Edell, Shapiro & Finnan, LLC

(57) ABSTRACT

Presented herein are techniques to facilitate data stream routing and entitlement for Internet of Things (IoT) data streams. In one example, a method is provided that may include causing an IoT device to connect to a plurality of access networks based on a data stream policy; directing, based on the data stream policy, an IoT gateway to transmit a plurality of output data streams to a plurality of destinations in which the plurality of output data streams are based on a source data stream obtained by the IoT gateway from the IoT device via one or more of the plurality of access networks. The method may further include determining a degradation for at least one access network and, upon determining the degradation, causing a remediation action to be performed by at least one of the IoT device and the IoT gateway based on the data stream policy.

20 Claims, 7 Drawing Sheets

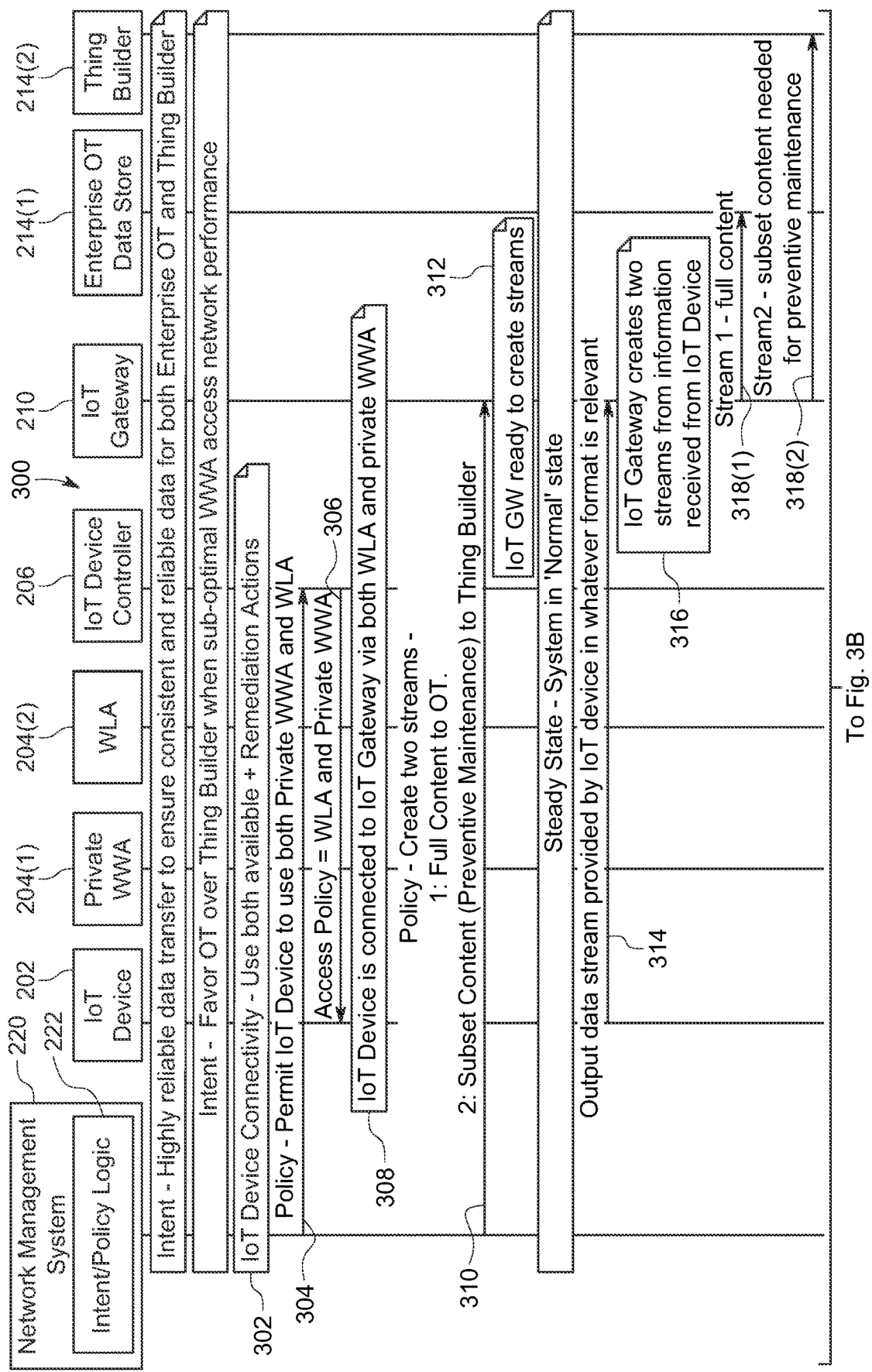

US 11,627,511 B2

TECHNIQUES TO FACILITATE DATA STREAM ROUTING AND ENTITLEMENT

TECHNICAL FIELD

The present disclosure relates to network equipment and services.

BACKGROUND

Networking architectures have grown increasingly complex in communications environments. In some cases, a networking architecture may facilitate connections for Internet of Things (IoT) devices. Networking architectures that facilitate connections for IoT devices have introduced new challenges for handling IoT data streams transmitted by IoT devices. One such challenge may involve reconciling requirements of different entities that expect to receive different data from IoT devices.

BRIEF DESCRIPTION OF THE DRAWINGS

FIGS. 3A and 3B are a message sequence diagram of a call flow illustrating example details associated IoT data stream routing and entitlement, according to an example embodiment.

DESCRIPTION OF EXAMPLE EMBODIMENTS

Overview

Data streams originating from Internet of Things (IoT or IOT) devices in IoT networking environments typically have multiple consumers, each with their own set of entitlements. With the incorporation of multiple access technologies for connecting IoT "things" or devices to one or more networks, dynamic network policies of when and how to route which parts or data objects, broadly 'content', of streams would be useful in order to cater to the location of an IoT device, available access types for the location, and utilization of those access types and stream consumer preferences. Provided herein are techniques that enable such constructs in order to permit improved management of such consumer entitlements.

In at least one example embodiment, a method is provided that may include causing an IoT device to connect to a plurality of access networks based on a data stream policy; directing, based on the data stream policy, an IoT gateway to transmit a plurality of output data streams to a plurality of destinations, wherein the plurality of output data streams are based on a source data stream obtained by the IoT gateway from the IoT device via one or more of the plurality of access networks; determining a degradation for at least one access network of the plurality of access networks; and upon determining the degradation, causing a remediation action to be performed by at least one of the IoT device and the IoT gateway based on the data stream policy, wherein the remediation action includes, at least in part, limiting one or more of the plurality of output data streams that are transmitted to one or more of the plurality of destinations

EXAMPLE EMBODIMENTS

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise Internet of Things (IoT or IOT) devices) that may be owned, operated, and/or otherwise associated with an enterprise may be utilized to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for IoT devices, and/or the like).

Figure 1A:
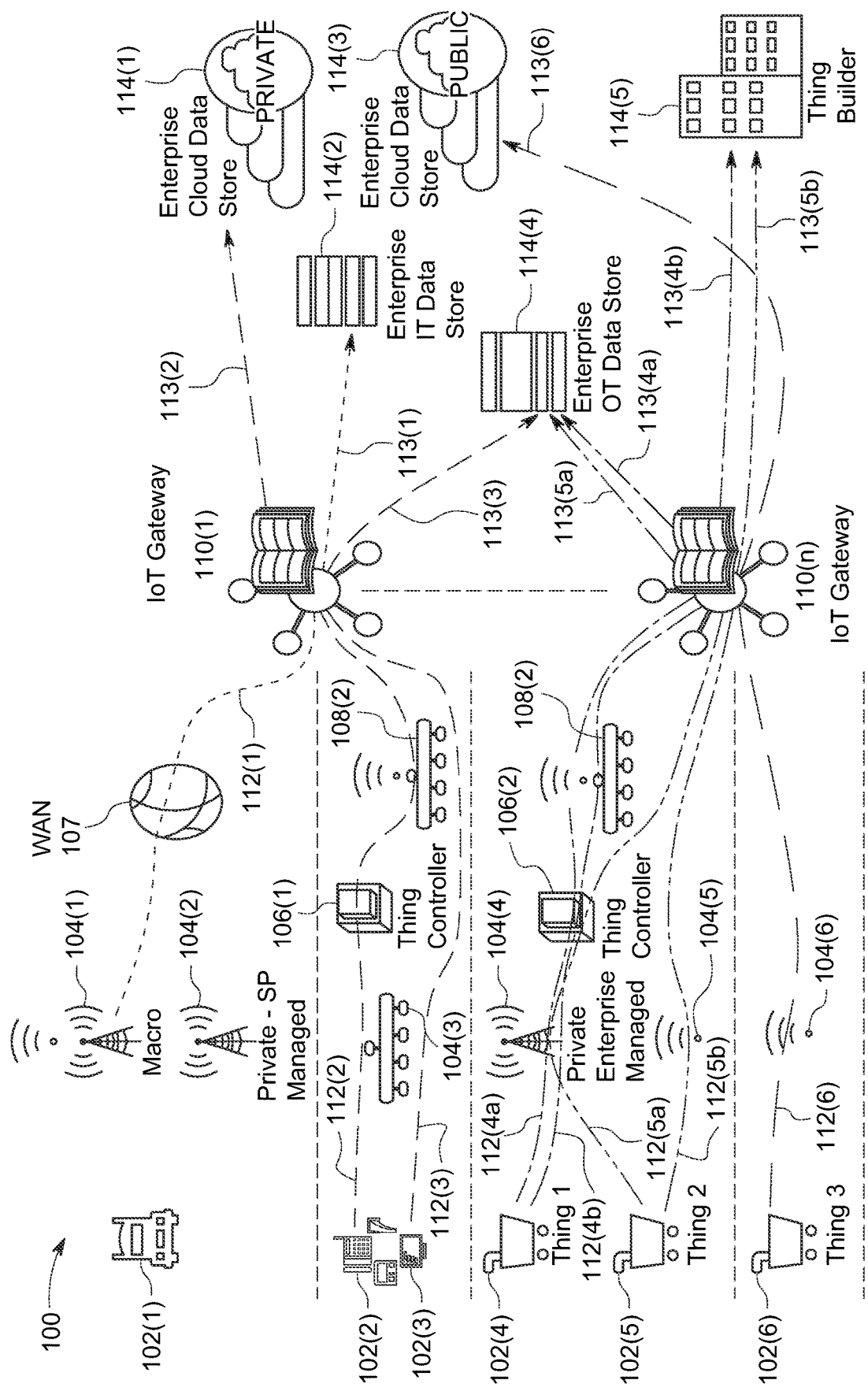
FIG. 1A is a diagram illustrating example details for a system involving data streams for various Internet of Things (IoT) devices, according to an example embodiment.

Referring to FIG. 1A, FIG. 1A is diagram illustrating example details for a system 100 involving data streams for various Internet of Things (IoT or IOT) devices, according to an example embodiment. In at least one embodiment, system 100 may include multiple IoT devices 102, such as IoT devices 102(1)-102(6), that can utilize various access networks 104, such as access networks 104(1)-104(6), for network connectivity to one or more IoT gateways (GWs) 110, such as any of IoT gateways 110(1)-110(n), which may transmit parts or data objects, broadly 'content', of source data streams 112, such as source data streams 112(1)-112(6) obtained from IoT devices 102(1)-102(6), via one or more output data streams 113(1)-113(6) to one or more data consumers or destinations 114, such as destinations 114(1)-114(5). Output data streams are not labeled for FIGS. 1A and 1B for purposes of brevity only and instead are discussed with reference to the various destinations 114(1)-114(5).

Figure 1B:
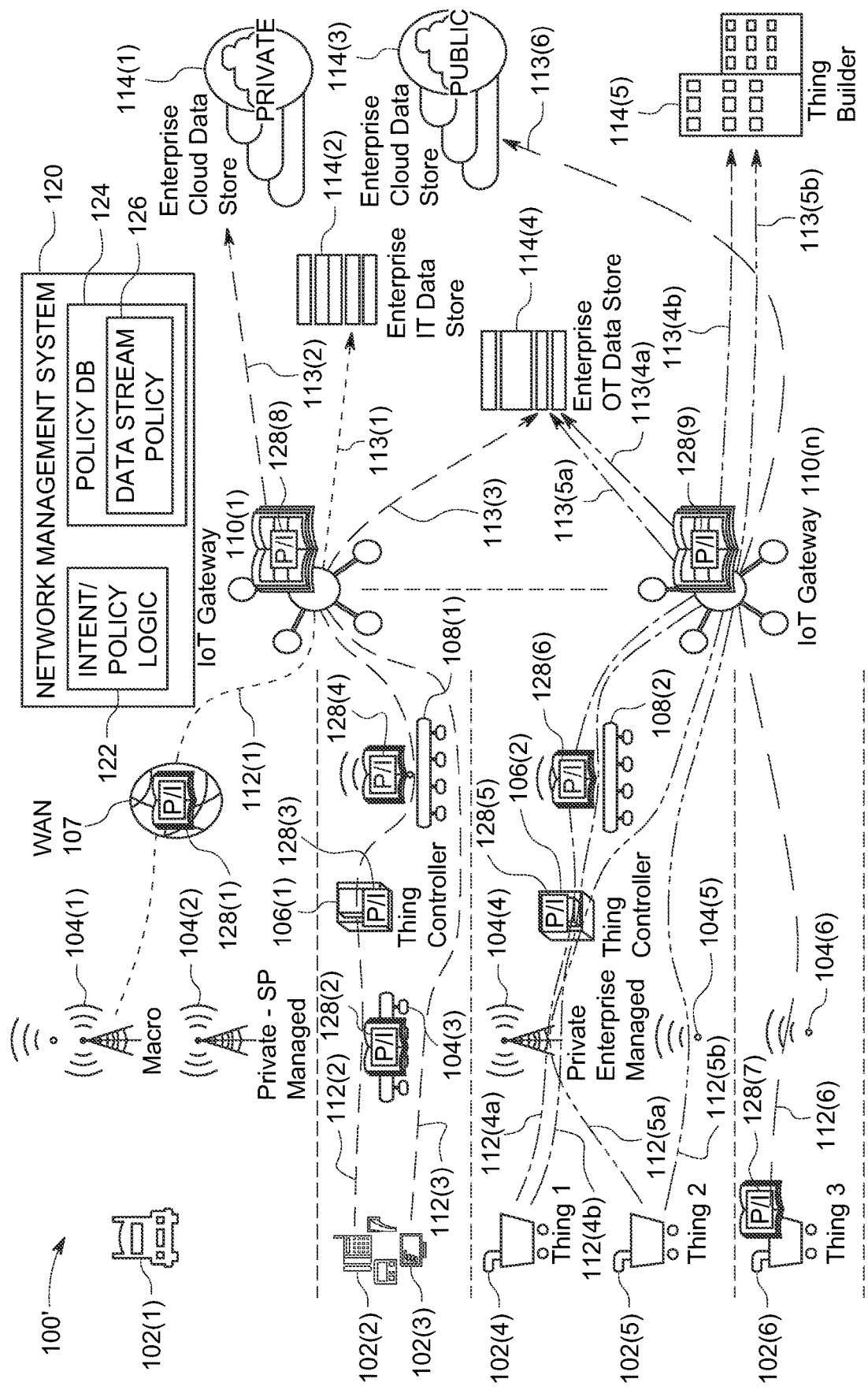
FIG. 1B is a diagram illustrating example details associated with techniques that may be implemented to facilitate routing and entitlement for the IoT data streams of the system of FIG. 1A, according to an example embodiment.

FIG. 1B illustrates a system 100' including a network management system 120, which may include intent/policy logic 122 and a policy database 124 within which one or more data stream policies 126 may be configured/stored. FIG. 1B is discussed with reference to FIG. 1A.

In some instances, network connectivity to an IoT gateway 110 for an IoT device 102 may be facilitated via one or more (Thing) controllers 106, such as Thing controllers 106(1) and 106(2) and/or one or more interfacing access networks 108, such as access networks 108(1)-108(2), discussed in further detail below.

As referred to herein, access networks, such as access networks 104 and 108 may include any combination of wireless and/or wired (also referred to as 'cabled') access networks. As referred to herein, wired or cabled access networks can refer to any Ethernet network, Ethernet switching system(s), and/or the like.

In various embodiments, wireless access networks can include any combination of a wireless wide area (WWA) access network, such as a licensed spectrum cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that typically provide a larger RAN coverage area as compared to the RAN coverage areas typically provided by wireless local area (WLA) radio nodes (e.g., Institute of Electrical and Electronics Engineers (IEEE) 802.11 access points, Wi-Fi® access points, Wi-Fi6® access points, etc.) for WLA access networks, such as unlicensed spectrum non-3GPP WLA access networks (e.g., Institute of Electrical and Electronic Engineers (IEEE) 802.11 (Wi-Fi®), IEEE 802.16 (WiMAX®), etc. access networks), unlicensed spectrum 3GPP access networks (e.g., License Assisted Access (LAA), enhanced LAA (eLAA), New Radio Unlicensed (NR-U), etc. access networks), and/or the like.

Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; WANs, such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider that may manage the private WWA access network, such as an enterprise (e.g., a private enterprise managed WWA). In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated/managed by any combination of traditional public mobile network operators/service providers, enterprises network operators/service providers (e.g., Cisco®, etc.), and/or third party network operators/service providers (e.g., neutral host network operators/service providers, cloud service providers, etc.). A private WWA access network may also be referred to as a stand-alone non-public network (SNPN). Cisco is a registered trademark of Cisco Technology, Inc.

Radio nodes [sometimes referred to as access points (APs)] for WWA and WLA may include any combination of hardware (e.g., communications units, receiver(s), transmitter(s), transceiver(s), antenna(s) and/or antenna array(s), processor(s), memory element(s), baseband processor(s) (modems), etc.), mobile core network elements, controllers, software, logic, and/or any other elements/entities that may facilitate over-the-air Radio Frequency (RF) access network connections for one or more elements of a system.

Two private WWA access networks are illustrated in FIGS. 1A and 1B including a private service provider (SP)-managed WWA access network 104(2) and a private enterprise-managed WWA access network 104(4). Also shown is a public (macro) WWA access network 104(1), which may also provide WLA access network connectivity in some instances. A wired or cabled access network 104(3) is also shown in FIGS. 1A and 1B. A Wide Area Network (WAN) 107 (e.g., public internet access) is also illustrated in FIGS. 1A and 1B. Combination WLA and cabled access networks 108(1) and 108(2) are also illustrated in FIGS. 1A and 1B. WLA access networks 104(5) and 104(6) are also illustrated in FIGS. 1A and 1B.

In various embodiments, an IoT 'thing' or device, such as an IoT device 102, may be any device that may transmit one or more source data streams 112 in a system, such as system 100. The terms 'IoT thing', 'IoT device', 'thing', 'electronic device', 'automation device', 'machine', 'robot', and variations thereof are inclusive of devices used to initiate a communication, such as a computer, a vehicle and/or any other transportation related device having electronic devices configured thereon, an automation device, an enterprise device, a sensor and/or sensor system, an appliance or appliance system, and/or any other device and/or combination of devices, component, element, and/or object capable of initiating voice, audio, video, media, or data exchanges within a system. Devices discussed herein may also be inclusive of one or more interfaces such as a microphone, a display, a keyboard, or other terminal equipment. Devices discussed herein may also be any device that seeks to initiate a communication on behalf of another entity or element such as a program, a database, or any other component, device, element, or object capable of initiating an exchange within a system. It is to be understood that any number of devices may be present in systems discussed herein.

Although not illustrated in FIG. 1, it is to be understood that IoT devices 102 may also include any combination of hardware (e.g., communications units, receiver(s), transmitter(s), transceiver(s), antenna(s) and/or antenna array(s), processor(s), memory element(s), baseband processor(s) (modems), etc.), controllers, software, logic, and/or the like to facilitate any combination of WLA, WWA, and/or wired access network connections.

IoT devices 102(1)-102(6) may be identified by device type or class. For example, different IoT device types may indicate, but not be limited to, a robot/manufacturing device type, a sensor device type, a surveillance device type, etc. Different classes may indicate, but not be limited to, mobile, stationary, nomadic, etc. IoT devices. In some instances, type/class may indicate constraints or no-constraints on processing power, memory, processor type (e.g., Advanced Reduced Instruction Set Computer (RISC) Machine (ARM®), Raspberry Pi®, etc.). Arm is a registered trademark of Arm Limited (or its subsidiaries). Raspberry Pi is a registered trademark of the Raspberry Pi Foundation. In still some instances, type/class may indicate categories of wireless access capabilities (e.g., Wi-Fi, 4G, 5G, etc.). In some instances, IoT devices may be identified values in a class or combined to provide a composite definition of a specific device genus such that all devices in that genus could be subject to a certain intent. Consider an example in which an IoT device may be a cellular connected device with a certain category (CAT) of modem (e.g., CAT-m, CAT-16, etc.) or flavors of Wi-Fi 802.11ac versus Wi-Fi 6, etc.

A device controller, such as Thing controllers 106, may interface with IoT devices to facilitate control and/or management of IoT devices, as well as to receive (via any combination of push and/or pull mechanisms) one or more data streams from IoT devices. An IoT gateway, such as IoT gateways 110(1)-110(n) may perform actions on one or more data streams obtained from IoT devices in order to transmit output data streams to one or more destinations (e.g., based on their entitlements, etc.). In various embodiments, various actions that may be performed by IoT gateways may include stream duplication, data filtering, parsing, discarding, obfuscation, and/or the like in order to create/generate one or more output data streams that can be transmitted to one or more destinations based on source data streams obtained from one or more IoT devices.

In various embodiments, consumers or destinations 114 may include any combination of enterprise On-Premise (On-Prem) or local data stores or databases that may be considered local to an enterprise data network (such as an enterprise Information Technology (IT) data store 114(2), an enterprise Operational Technology (OT) data store 114(4), and an enterprise cloud data store 114(1) within an enterprise private cloud run by enterprise IT); Off-Premise (Off-Prem) or remote data stores that may considered remote to an enterprise data network (, enterprise cloud data store 114(3) within a public cloud, a different enterprise site); IoT device manufacturers/makers (such as a Thing Builder 114 (5); an IoT device leaseholder (not shown); and/or the like.

As referred to herein, 'local' with reference to a destination/consumer can be characterized as being within an enterprise network and/or in an enterprise data center. In some instances, such a consumer could be deployed on an edge cloud. In one example, 'local' can be geographically local or logically local with respect to access time. A private cloud deployed On-Prem or via an edge cloud can be considered local. In this context, a private cloud deployed somewhere else Off-Prem or a public cloud can be considered 'remote'.

Many IoT 'things' or devices in an IoT network environment can generate either multiple streams of data or a composite data stream where all objects in the stream may not have the same destination. There are existing approaches relying on local configuration of 'IoT gateways' that permit selective filtering, obfuscation, and destination selection by stream. IoT device owners (e.g., enterprise entities), device makers/manufacturers, and device leaseholders (e.g., an entity that leases devices to another entity) typically each have requirements for data routing derived from their entitlement to specific data objects (content) in the IoT data stream output from an IoT device. Such data routing requirements are currently reflected in a composite local configuration for an IoT gateway.

However, it would be advantageous to both abstract these requirements such that the intent of each interested party can be described and to provide policy driven data routing parameters that reflect the intent, specifically in the context of the deployment of cabled and wireless (e.g., Wi-Fi and cellular) access within a given IoT environment.

Techniques described herein address the problem of taking an expressed intent, determining network and data routing policies contingent on the characteristics of a multi-access technology deployment, and applying those policies.

Consider various example source data streams 112(1)-112 (5) as depicted in FIG. 1A that may utilize different access technology combinations along with the functionality of IoT gateways 110(1)-110(n) at which one or more of stream duplication, data filtering, discarding, parsing, obfuscation, and/or the like may be implemented for transmitting one or more output data streams 113(1)-113(5) to one or more of destinations 114(1)-114(5).

For example, IoT device 102(1) is public (macro) WWA access network 104(1) connected via WAN 107 for transmitting source data stream 112(1) to IoT gateway 110(1) which builds a single output data stream 113(1) that is transmitted to a local data store, such as enterprise IT data store 114(2). In some instances, IoT device 102(1) could also connect to private SP-managed WWA access network 104 (2).

In another example, IoT device 102(2) is cable-connected to Thing controller 106(1) for transmitting a source data stream 112(2) to IoT gateway 110(1), which is transmitted as output data stream 113(2) to enterprise cloud data store 114(1) within the enterprise private cloud run by enterprise IT. IoT device 102(3) is also cable-connected to Thing controller 106(1) for transmitting a source data stream 112(3) to IoT gateway 110(1), which is transmitted as output data stream 113(3) to enterprise OT data store 114(4).

In another example, IoT device 102(4) (referred to in FIGS. 1A and 1B as 'Thing 1') is dual private WWA access network 104(4) connected via Thing controller 106(2) to transmit source data streams 112(4a) and 112(4b) in which IoT gateway 110(n) builds a Thing Builder 114(5) output data stream 113(4b) and an enterprise OT data store 114(4) output data stream 113(4a). It is noted that there may or may not be a correlation between content included source data stream 112(4a) and output data stream 113(4a) and source data stream 112(4b) and output data stream 113(4b), as IoT gateway 110(n) may be build output data streams 113(4a) and 113(4b) based on content obtained via any combination of source data stream 112(4a) and/or source data stream 112(4b).

In another example, IoT device 102(5) (referred to in FIGS. 1A and 1B as 'Thing 2') is connected via a private WWA access network 104(4) to transmit a source data stream 112(5a) and is connected via a WLA access network 104(5) to transmit a source data stream 112(5b) in which IoT gateway 110(n) builds a Thing Builder 114(5) output data stream 113(4b) and an enterprise OT data store 114(4) output data stream 113(4a). It is noted that there may or may not be a correlation between content included source data stream 112(5a) and output data stream 113(5a) and source data stream 112(5b) and output data stream 113(5b), as IoT gateway 110(n) may be build output data streams 113(5a) and 113(5b) based on content obtained via any combination of source data stream 112(5a) and/or source data stream 112(5b).

In another example, source data stream 112(6) is transmitted by IoT device 102(6) (referred to in FIGS. 1A and 1B as 'Thing 3'), which can be connected through a WLA access network 104(6) via IoT gateway 110(n) in which IoT gateway builds an output data stream 113(5) that is transmitted to enterprise cloud data store 114(3) within the public cloud.

It is theoretically possible to craft manual configurations for each element/node/function (e.g., device/endpoint, access network, IoT Gateway, SP network, etc.) in a source data stream path in order to deliver data objects (content) to various destinations. However, managing these configurations as dynamic policies based on the intent for the service would benefit operational deployments of any significant scale.

Embodiments herein may utilize the type, capabilities, and availability of access network connectivity in order to derive dynamic polices for data stream routing and entitlement based on those conditions. In various embodiments, availability and cost of cloud resources, changing a preferred access technique based on services to be utilized in a given time period, deciding to suspend certain source and/or output data streams based on access network availability and/or performance, etc. Link state may be one component of the policy determination.

This is rather more than classic access network policies for clients as in general these are typically at the level of:
Client X may access network 1, network 2, network 3 with preference j, k, l respectively; or
Application Identifier (ID) "A" may use access network 1, Application ID "B" may use access network 2, Application "C" may use access network 1 or 2, Application "D" may use both access network 1 and 2.

As opposed to such classic access network policies, embodiments herein consider, at least in part, the entitlement to a given source data stream from a specific type or class of IoT devices (e.g., manufacturing robot/machine, sensor, etc.) along with the type of destination for that source data stream (e.g., On-Prem, Off-Prem, other corporate/enterprise site, cloud service, etc.) as modifying factors in addition to the examples from conventional approaches in order to configure data stream routing policies for one or more IoT devices. Such policies may encompass availability and cost of cloud resources, changing preferred access technique based on services necessary in a given time period, deciding to suspend certain streams based on access network availability and/or performance. Link state may be one component of the policy determination. Thus, embodiments herein herein may consider not only access network connectivity but also intermediate connections, as well as external resource availability and/or performance such as for cloud storage, as factors in realizing data stream routing and entitlement intent via one or more policies that can be applied/enforced within an IoT environment.

FIG. 1B illustrates an example overlay of data stream routing/entitlement intent along with policy (P/I) interpretation and enforcement at various elements/nodes for system 100', which is shown as P/I 128(1)-128(9) and may be realized based on data stream policy 126 that can be configured to trigger network management system 120 via intent/policy logic 122 to enforce the data stream routing/entitlement intent (expressed via the data stream policy 126) based on determining degradation for any combination of access networks 104(1)-104(6)/108(1)-108(2) and/or destinations 114(1)-114(5). Enforcement of the data stream policy 126 can include causing one or more remediation actions to be performed by any combination of one or more IoT devices 102(1)-102(6) and/or one or more IoT gateways 110(1)-110(n) that obtain source data streams from the devices. Thus, embodiments herein may facilitate an application of dynamic policy in a new context. In one embodiment, network management systems discussed herein may be implemented as a control center or a Cisco® Digital Network Architecture Center (DNAC) that may manage IoT devices, gateways, controllers, operations, etc. etc. for an IoT network environment.

To exemplify various aspects of data stream routing/entitlement intent that may be realized via data stream policy 126, consider various example access network and/or destination degradations that may be determined within system 100' and that may cause one or more remediation actions to be performed within system 100' by network management system 120 via intent/policy logic 122.

In one example, if Thing 2 (IoT device 102(5)) is simultaneously connected via two private WWA (cellular) access network 104(4) links, one 4G and one 5G, and the cabled connectivity between the Thing controller 106(2) and the IoT gateway 110(n) fails, the data stream policy 126 may be configured to cause a remediation action that involves stopping the Thing Builder 114(5) output data stream 113 (5b). In various embodiments, such a remediation action can include causing Thing 2 to stop or limit data objects (content) being transmitted via its source data streams 112(4a) and/or 112(4b) that are to be sent to Thing Builder 114(5) via the output data stream 113(5b) transmitted by IoT gateway 110(n) and/or causing IoT gateway 110(n) to stop or limit transmitting the output data stream 113(5b) to Thing Builder 114(5).

In various embodiments, limiting source and/or output data streams can include limiting a frequency or rate of transmissions and/or limiting data transmitted to a subset of one or more types of data transmitted. In some embodiments, different transmission rates or levels can be configured for a data stream policy (e.g., high, medium, low, fractional levels/percentages, etc.), which may be triggered based on any combination of degradations determined for one or more access networks. For example, the extent of performance degradation for an access network that may be determined based on multiple performance thresholds configured for the access network can be used to change the rate of transmissions to a level corresponding to a given performance threshold.

In another example, if the Thing 2 source data stream 112(4b) (that may utilize private cellular 5G) includes content that is to be transmitted to the enterprise OT data store 114(4) has an update rate that drops below an acceptable threshold, the data stream policy 126 can be configured to cause a remediation action that involves sending all updates from Thing 2 over a more reliable but lower throughput access connection (e.g., private Cellular 4G). Such a remediation action can be effected by both applying the data stream policy 126 at a given IoT device (such as Thing 2) via an access policy set for the IoT device to transmit content via a particular access network and/or also monitoring to ensure that the stream is not showing up via the Private cellular 5G access network.

In yet another example, if the public cloud hosting enterprise cloud data store 114(3) is experiencing a service degradation such that it is unable to accept the output data stream 113(6) based on content sent via the source data stream 112(6) from Thing 3 (IoT device 102(6)), the data stream policy 126 can be configured to cause a remediation action that involves redirecting the stream locally via IoT gateway 110(n) to transmit the output data stream 113(6) to enterprise cloud storage provided via enterprise cloud data store 114(1). If the output data stream 113(6) is redirected to enterprise storage, a further remediation action may include moving Thing 3 to a different WLA access network that supports an increased stream rate/more rapid updates and/or a more complex stream in order to to take advantage of the high processing capabilities of the enterprise storage by setting an access policy for Thing 3 to send its source data stream 112(6) via a particular WLA access network.

Such techniques may also be utilized for degradations involving any other destinations, such as enterprise data stores, etc. For example, if an enterprise cloud storage service is degraded, a remediation action could involve redirecting a stream non-cloud enterprise storage or to public cloud storage (if not degraded).

In yet another example, if service for a destination such as enterprise cloud storage is degraded, a remediation action can include instructing a Thing controller to enforce rate reduction mechanisms, such as limiting the rate for transmitting a source data stream obtained from an IoT device (e.g., once every 'X' seconds/minutes/hours/etc.). Other remediation actions for a Thing controller can be envisioned.

In yet another example based on the previous example, if the enterprise cloud storage service degradation is resolved, rate reduction mechanisms enforced at the cabled access and at the Thing controller to the IoT gateway connectivity can be removed.

These examples actions are only a few of the many actions that may be performed utilizing techniques provided herein and are not meant to limit the broad scope of the present disclosure. Virtually any other actions may be utilized in accordance with the techniques herein and, thus, are considered to be within the scope of the present disclosure. For example, cost may additionally be considered in some instances. In one example, determining that a cost associated with particular access technology is 'X' (e.g., per megabyte (MB), per time of day, etc.), different cost public cloud resources can be selected based on perceptions of maximum stream rate and coverage. In another example, multi-access as a mechanism to provide highly resilient network connectivity could map to a policy of data store resiliency using multiple mechanisms. For example, an SP-managed service may provide more cost-effective storage when using that SP's connectivity service, and so on.

Consider an example algorithm that may be performed by intent/policy logic 122 during operation to facilitate a steady state for the data stream policy 126 based on stream type such as, for example, source data streams 112(5a) and 112(5b) being transmitted by IoT device 102(5) (Thing 2).

For example, consider that intent/policy logic 122 obtains performance indications for private enterprise-managed WWA access network 104(4) and also for WLA access network 104(5). In various embodiments, performance indications may include throughput, latency, signal strength distribution, packet loss, etc. In still some instances, a performance indicator may be a scalar value calculated from various values (e.g., throughput, latency, etc.). In still some instances, performance indications may be indicated as levels, colors (e.g., Red, Orange, Green, etc.). In various embodiments, performance indications can be sent in the form of streamed telemetry, polled using Representational State Transfer (REST) Application Programming Interfaces (APIs), stored in files and transferred periodically, reported from trusted clients, learned via probes (e.g., wired and/or wireless via span ports), combinations thereof, and/or the like These example performance indications and techniques for obtaining such indications are only a few of the many different types of performance indications/techniques for obtaining that can be utilized in accordance with techniques of the present disclosure and are not meant to limit the broad scope of the present disclosure. Virtually any performance indications and techniques for obtaining such indications can be utilized and, thus, are clearly within the scope of the present disclosure.

For the present example, consider that the example algorithm configured for data stream policy 126 is configured as:
    If private WWA performance <minimum over time 'Y',
      then private WWA(degraded)

As illustrated above, access network performance can be considered over a period of time/duration (e.g., time 'Y'). Consider further that data stream routing/entitlement intent for this case is: 'Reduce-Streams'. The data stream policy 126 for this intent may include remediation actions such as:
    Thing-Builder Stream OFF;
    End device access network policy is to be set to only use WLA access unless WLA access is unavailable and then use private WWA access as a Last-Resort; and
    If WLA access is unavailable and [private WWA(degraded) & Last-Resort(TRUE)], then modify IoT gateway policy to reduce a rate of requested data from an endpoint.

Thus, remediation actions for such a data stream policy can include any combination of stopping or limiting content transmitted to/from IoT gateway 110(n) via output data streams 113(5a) and/or 113(5b) and/or enforcing different access network connections for IoT device 102(5). In some embodiments, destinations may be prioritized or otherwise ranked for a data stream policy such that the decision of which streams to stop/limit may be determined based on destination priorities.

Figure 2:
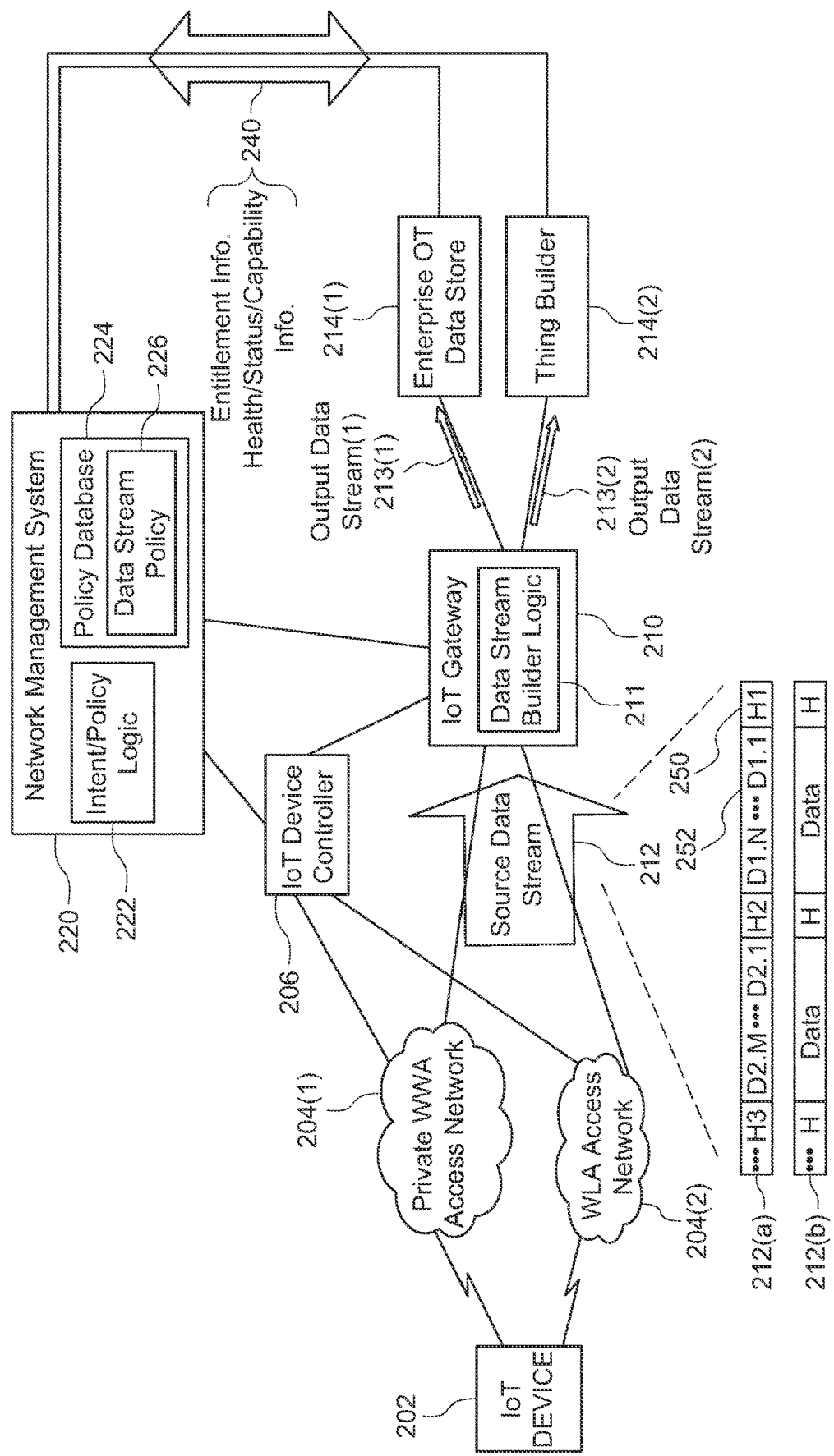
FIG. 2 is a diagram of another system in which techniques may be implemented to facilitate IoT data stream routing and entitlement, according to an example embodiment.
Figure 3B:
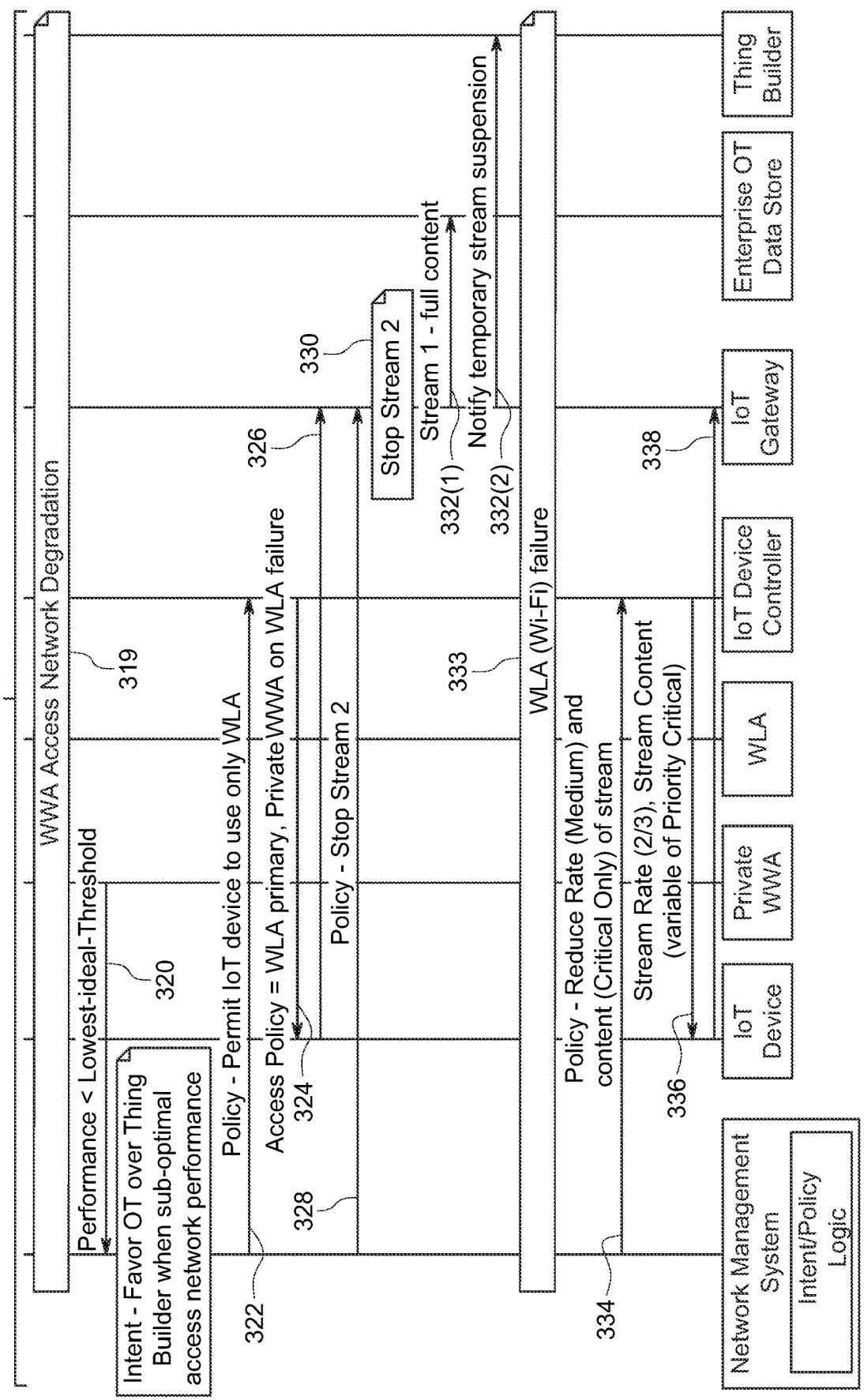

Consider another system 200, as shown in FIG. 2, which is discussed in reference to FIGS. 3A and 3B, which are a message sequence diagram of a call flow 300 illustrating other example details associated IoT data stream routing and entitlement that may be provided, according to an example embodiment.

System 200 includes an IoT device 202, a private WWA access network 204(1), a WLA access network 204(2), an IoT device controller 206, an IoT gateway 210 including data stream builder logic 211, an enterprise OT data store 214 a Thing Builder 214(2) (which may be inclusive of a data store for Thing Builder 214(2)), and a network management system 220 including intent/policy logic 222 and a policy database 224 within which a data stream policy 226 can be configured/stored.

IoT device 202 may interface/connect with private WWA access network 204(1) and WLA access network 204(2), which may further interface with IoT device controller 206 and IoT gateway 210. IoT device controller 206 may further interface with network management system 220 and IoT gateway 210 utilizing any combination of wired and/or wireless access network(s) (not shown in FIG. 2). IoT gateway 210 may further interface with network management system 220 and various IoT data consumers/destinations, including enterprise OT data store 214(1) and Thing Builder 214(2). Enterprise OT data store 214(1) and Thing Builder 214(2) may also interface with network management system in order to send and/or receive various information 240 to/from network management system, such as entitlement information (e.g., type(s) of data that the destination expects to receive, frequency or rate of data, etc.), health/status/capability notifications (e.g., destination health/status/capability, such as online, offline, constrained/degraded, etc.), cost information, partnership/preference information (e.g., partnership/preferences for destinations, such as in association with one or more access network providers), combinations thereof, and/or the like.

It is to be understood that elements of FIGS. 2 and 3A-3B, such as IoT device 202, access networks 204(1)-204(2), IoT device controller 206, IoT gateway 210, network management system 220, and various destinations 214(1)-214(2) may be configured/operate in a similar manner as analogous elements discussed above for FIGS. 1A-1B.

In one example during operation, consider that IoT device 202 outputs a source data stream 212 that is obtained by IoT gateway 210. Utilizing the source data stream 212 and, as directed by intent/policy logic 222 discussed below with reference to FIGS. 3A and 3B, IoT gateway 210 via data stream builder logic 211 can build/generate two output data streams including a first output data stream 213(1) that is transmitted to enterprise OT data store 214(1) and a second output data stream 213(2) that is transmitted to Thing Builder 214(2).

Source data stream 212 may be transmitted by IoT device 202 in any relevant format that can be consumed by IoT gateway 210 in order to parse, replicate, filter, discard, obfuscate, etc. data objects/content from the source data stream 212 in order to generate output data streams 213(1)-213(2). A data stream may be carried via one or more packets of one or more packet flows. In various embodiments, source data stream 212 may be transmitted as one composite data stream including one or more headers in which each header is followed by a certain type of data or data objects (content) or may be multiple data streams, each including one or more headers/data. The header may identify the data that is to follow the header. As illustrated in FIG. 2, in one example source data stream 212 may be transmitted by IoT device 202 as a first source data stream 212(a) transmitted via one access network and a second source data stream 212(b) via a second access network. The first source data stream includes a number of headers 250 and data 252 following each header 250. For example, a first header H1 is followed by data D1.1-D1.N, a second header H2 is followed by data D2.1-D2.M, and so on. A similar header/data format is illustrated for the second output data stream 212(b). Output data streams 213(1) and 213(2) may also be formatted in a similar manner. In various embodiments, header information carried in a header for an IoT data stream (source or output) can include application ID information (e.g., application 1, application 2, etc.), data type information (e.g., telemetry data, sensor data, diagnostic data, maintenance data (e.g., preventative, corrective, condition-based, etc.), data priority information (e.g., critical, normal, medium, etc.), device identifying data (e.g., model number, serial number, firmware information, etc.), etc.), and/or the like.

Referring to FIG. 3A, consider that the data routing/entitlement intent for system 200 is to provide highly reliable data transfer to ensure consistent and reliable data for both the enterprise OT data store 214(1) and Thing Builder 214(2) in which data transfer to the enterprise OT data store 214(1) is favored over the Thing Builder 214(2) when there is suboptimal WWA access network performance. Based on such intent, data stream policy 226 is configured for policy database (e.g., by an enterprise IT/OT administrator, etc.), as shown at 302, that indicates that the IoT device type/class to which IoT device 202 belongs is to utilize both the private WWA access network 204(1) and the 204(2) access network until a degradation is determined for an access network (and/or for a destination), in which case one or more remediation actions can be triggered based on the determined degradation.

Although not illustrated in FIG. 3A, intent/policy logic 222 may determine the type/class for IoT device 202 and its corresponding data stream policy 226 through a variety of mechanisms. For example, in one embodiment, the network management system 220/intent/policy logic 222 can obtain a type/classification identification for IoT device 202 from another system/network element, such as an enterprise identity/security/policy network element, an enterprise device repository, an enterprise equipment identity register (EIR), and/or the like. In some instances, the identification can be pushed from other system/network element or can be pulled from the other system/network element via a pre-access authorization for the IoT device 202. In other embodiments, the type/class for IoT device 202 may be manually configured for network management system 220/intent/policy logic 222, learned during onboarding of IoT device 202, learned as part of authorization of the IoT device 202 to access the network, learned during registration of the IoT device 202 to the network (e.g., based on an equipment identifier such as International Mobile Equipment Identity (IMEI) or the like), and/or the like. Based on the type/class identification for the IoT device 202, intent/policy logic 222 can obtain the corresponding data stream policy 226 for the IoT device 202.

Consider for the present example, that the data stream policy 226 that is to be utilized to enforce such intent may be configured as:
If private WWA performance≥lowest-ideal-threshold over time 'Y', then private WWA(normal):
Policy⇒'Steady State':
End device access network policy is to be set to use WLA access and private WWA access;
Enterprise-OT Stream: Full content; and
Thing-Builder Stream: Maintenance content.
If private WWA performance <lowest-ideal-threshold over time 'Y', then private WWA(degraded):
Policy⇒'Reduce Streams':
Thing-Builder Stream: OFF;
End device access network policy is to be set to only use WLA access unless WLA access is unavailable and then use private WWA access as a Last-Resort; and
If WLA access is unavailable and [private WWA (degraded) & Last-Resort(TRUE)], then modify IoT device controller to reduce rate of requested data from an endpoint.

Based on the data stream policy 226, intent/policy logic 222 instructs IoT device controller 206, at 304, to set the access policy for IoT device 202 to utilize both the private WWA access network 204(1) and the WLA access network 204(2) for sending the source data stream 212 to IoT gateway 210. At 306, IoT device controller 206 instructs the IoT device 202 regarding the access policy (e.g., access policy=private WWA and WLA), which triggers the IoT device 202 to connect to the IoT gateway 210 via both of the private WWA access network 204(1) and the WLA access network 204(2), as shown at 308.

At 310 based on the data stream policy 226, intent/policy logic 222 instructs the IoT gateway 210/data stream builder logic 211 that it is to create two output data streams utilizing the source data stream 212 obtained from IoT device 202, including: 1) a first output data stream (e.g., output data stream 213(1)) that is to be sent to enterprise OT data store 214(1) that includes the full content received from IoT device 202 via the source data stream 212; and 2) a second output data stream (e.g., output data stream 213(2)) that is to be sent to Thing Builder 214(2) that includes a subset of the content received from IoT device 202, specifically, content that is identified as preventative maintenance within the source data stream 212. In various embodiments, destinations to which output data streams are to be sent may be identified using any combination of IP addresses, port numbers, Fully Qualified Domain Names (FQDNs), and/or the like. Based on the instruction obtained from the intent/policy logic 222, the IoT gateway 210/data stream builder logic 211 is ready to create the output data streams, as shown at 312.

Various operations related to steady state operations are illustrated at 314, 316, 318(1) and 318(2) for cases in which the system 200 is in a 'normal' state such that performance for the private WWA access network 204(1) is determined by intent/policy logic 222 to be greater than or equal to a lowest ideal threshold (e.g., the logic is not received indications from the private WWA access network 204(1) that the access network performance is degraded).

For example, as shown at 314, IoT device 202 transmits the output data stream 212 to the IoT gateway 210 in whatever format may be relevant (e.g., multiple streams, as single composite data stream, etc.). At 316, the IoT gateway 210 via data stream builder logic 211 creates two output data streams utilizing the source data stream 212 in order to transmit the first output data stream (213(1)) to the enterprise OT data store 214(1) including the full content, as shown at 318(1), and to transmit the second output data steam (213(2)) to the Thing Builder 214(2) including the subset of the content needed for preventative maintenance data, as shown at 318(2).

Turning to FIG. 3B, FIG. 3B illustrates various operations that may be performed based on the intent/policy logic 222 based on determining a degradation for one or more of the access networks. For example, operations 320, 322, 324, 326, 328, 330, 332(1), and 332(2) illustrate various operations that may be performed based on determining a degradation for the private WWA access network 204(1), such as the performance of the WWA access network falling below the lowest ideal threshold; and operations 334, 336, and 338 illustrate various operations that may be performed based on determining a degradation for the WLA access network 204(2), such as a failure occurring for the WLA access network (e.g., for one or more APs and/or the WLC for the network).

Consider at 319, for example, that there is a performance degradation for the private WWA access network 204(1) and, at 320, that the intent/policy logic 222 obtains a performance indication from the private WWA access network 204(1) that performance for the network is less than the lowest ideal threshold. Recall, that the intent for system 200 is to favor sending data to the enterprise OT data store 214(1) over the Thing Builder 214(2) when there is suboptimal WWA access network performance. Thus, based on obtaining the indication at 320 and the data stream policy 226, intent/policy logic 222 instructs IoT device controller 206, as shown at 322, to set the access policy for the IoT device 202 to permit the device to use only the WLA access network 204(2) for sending the source data stream 212 and, further based on the policy, to use the private WWA access network 204(1) in the event of a failure with the WLA access network 204(2).

At 324, IoT device controller 206 instructs the IoT device 202 regarding the access policy (e.g., access policy=WLA primary, private WWA on WLA failure), which causes the IoT device 202 perform a remediation action in which the IoT device 202 send the source data stream 212 to the IoT gateway 210 via the WLA access network, as shown at 326. Thus, in effect, the data stream policy 226 can provide for directing an IoT device to utilize a first access network as a primary access network and to utilize a second access network as a backup access network in which the backup access network is not utilized unless there is a failure determined for the primary access network.

Further at 328, intent/policy logic 222 instructs the IoT gateway 210/data stream builder logic 211 that it is to stop transmitting the second output data stream 213(2) to Thing Builder 214(2), which causes the IoT gateway 210 to perform remediation actions including stopping the transmission of the second output data stream, as shown at 330, and in place of the second output data stream, notifying Thing Builder 214(2) that the stream is temporarily suspended, as shown at 332(2). The IoT gateway 210/data stream builder logic 211 continues to create and transmit the first output data stream to the enterprise OT data store 214(1), as shown at 332(1).

Consider in another example at 333, that there is a failure for the WLA access network 204(2) [note, an indication being obtained from/determined for the WLA access network regarding the WLA access network failure is not shown in FIG. 3B for purposes of brevity only]. Based on the determined degradation for the WLA access network 204(2) and the data stream policy 226 (e.g., 'WLA access is unavailable and [private WWA(degraded) & Last-Resort (TRUE)]'), the intent/policy logic 222 instructs the IoT device controller 206, at 334, to reduce the stream transmission rate for the output source stream 212 transmitted by the IoT device 202 to a 'Medium' level and to reduce the content of the stream to only 'Critical' content. At 336, the IoT device controller 206 instructs the IoT device 202 to reduce the stream rate to a two-thirds level and to reduce the content of the source data stream 212 to include variables of priority 'Critical', which causes the IoT device 202 to perform remediation actions, as shown at 338, that includes reducing the rate of transmitting the source data stream 212 and to only include content in the source data stream that is identified as being associated with critical content/data objects.

Accordingly, as illustrated in FIGS. 3A-3B, multiple remediation actions may be performed based on determining a degradation of one or more access networks in order to enforce data routing/entitlement intent for a system.

Figure 4:
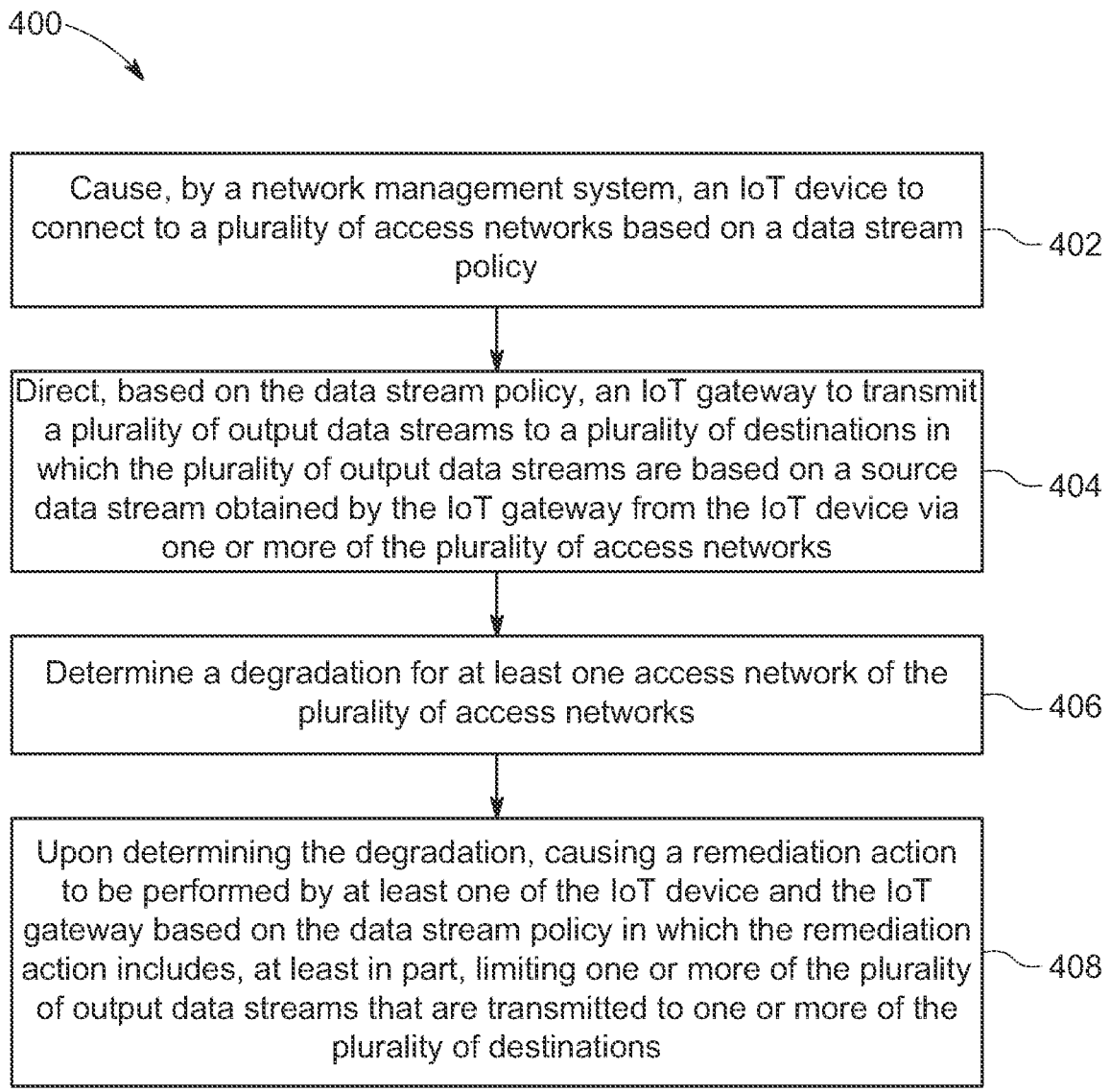
FIG. 4 is a flow chart depicting a method according to an example embodiment.

Turning to FIG. 4, FIG. 4 is a flow chart depicting a method 400 according to an example embodiment. In at least one embodiment, method 400 may be performed by a network management system/logic, such as network management system 120 including intent/policy logic 122 or network management system 220 including intent/policy logic 222.

At 402, the method may include causing, by a network management system, an IoT device to connect to a plurality of access networks based on a data stream policy. In one embodiment, the data stream policy may be based on a type or class of IoT devices to which the particular IoT device belongs.

At 404, the method may include directing, based on the data stream policy, an IoT gateway to transmit a plurality of output data streams to a plurality of destinations in which the plurality of output data streams are based on a source data stream obtained by the IoT gateway from the IoT device via one or more of the plurality of access networks.

At 406, the method may include determining a degradation for at least one access network of the plurality of access networks. The plurality of access networks may include at least two of a wireless local area access network, a wireless wide area access network, and a cabled access network. In one form, determining the degradation of the at least one access network can include one or more of determining a failure of the at least one access network and determining that a performance threshold for the at least one access network is breached (e.g., performance is less than a particular threshold, performance is between two thresholds, etc.).

At 408, the method may include, upon determining the degradation, causing a remediation action to be performed by at least one of the IoT device and the IoT gateway based on the data stream policy in which the remediation action includes, at least in part, limiting one or more of the plurality of output data streams that are transmitted to one or more of the plurality of destinations. In one form, causing the remediation action to be performed can include instructing the IoT gateway to suspend at least one output data stream from being transmitted to at least one destination of the plurality of destinations. In one form, the data stream policy can indicate a priority associated with each of the plurality of destinations such that at least one output data stream that is suspended is selected based on a particular priority associated with a particular destination (e.g., an enterprise data store, remote or local, may have a higher priority than the priority for a Thing Builder, etc.). In one form, causing the remediation action to be performed can include causing the IoT device to stop including certain information in the source data stream.

In one form, causing the remediation action to be performed can include causing the IoT device to change a frequency or rate for transmitting the source data stream that is obtained by the IoT gateway. In one instance, changing the rate can include setting the rate to a particular rate of a plurality of rates based on the data stream policy and an extent of the degradation for at least one access network of the plurality of access networks.

In one form, prior to determining the degradation, the method can include causing the IoT device to communicate the source data stream to the IoT gateway utilizing at least two access networks of the plurality of access networks (e.g., a private WWA access network and a WLA access network, etc.).

In one form, causing the remediation action to be performed can include causing the IoT device to utilize a first access network of the at least two access networks as a primary access network to communicate the source data stream to the IoT gateway and to utilize a second access network of the at least two access networks as a backup access network in which the backup access network is not utilized unless a failure is determined for the primary access network. In still one form, causing the remediation action to be performed can include managing one or more of sleep times, wake cycles, and/or resource scheduling for the IoT device via the access network to which the device is connected.

In one form, the method may further include determining a degradation in a capability of a particular destination of the plurality of destinations to obtain a particular output data stream from the IoT gateway instructing the IoT gateway to suspend the particular output data stream from being transmitted to the particular destination. In one form, the method may further include instructing the IoT gateway to transmit the particular data stream to another destination of the plurality of destinations. For example, for the embodiment of FIG. 2, network management system 220 may obtain capability information from Thing Builder 214(2) that indicates that the destination is temporarily unable to receive data, which may cause the network management system 220, via intent/policy logic, to instruct the IoT gateway to suspend the output data stream 213(2) from being sent to Thing Builder 214(2) and/or to redirect the output data stream to another destination.

In various instance, the plurality of destinations can include two or more of a local data store (e.g., a local IT and/or OT data store, a private cloud data store, etc.), a remote data store (e.g., a public cloud data store), a manufacturer of the IoT device (e.g., Thing Builder 214(2)), and a leaseholder associated with the IoT device. A leaseholder may be considered one or more intermediate third parties that lease IoT devices to another party, such as an enterprise entity.

Accordingly, aspects of techniques herein may enable dynamic policy components and their application when considering private WWA access networks and/or in combination with WLA and/or cabled access networks. In contrast to 3GPP based Access Traffic Steering, Switching, and Splitting (ATSSS) user equipment (UE) concepts that focus on access network policies between a 3GPP User Plane Function (UPF) and a device and that can affect multi-path across multiple UPFs, techniques herein are focused on the application level routing/entitlement and the policy related to such routing/entitlement when access network conditions change. ATSSS can provide methods to apply aspects of the desired policies at the UPF and the UE for 3GPP-based connectivity. However, techniques herein involve data stream/routing entitlement that can be applied as a type of edge compute resource that is independent of any 3GPP standards. For example, WLA and cabled access network are unlikely to make any use of a 3GPP core network. Additionally, IoT devices that are sourcing data streams may not be 3GPP compliant devices with respect to 3GPP ATSSS concepts.

Further, techniques herein consider not only access network connectivity as a basis for routing/entitlement actions, but also consider intermediate connections as well as external resource availability and performance such as for cloud storage destinations, etc. Thus, a multitude of different algorithms/data stream policies can be envisioned that consider multiple aspects for triggering various remediation actions. Policies can encompass availability and cost of cloud resources, changing a preferred access technique based on services utilized during a given time period, deciding to suspend certain streams based on access network availability and/or performance (in which link state can be one component of the policy determination), and/or the like as discussed herein.

Figure 5:
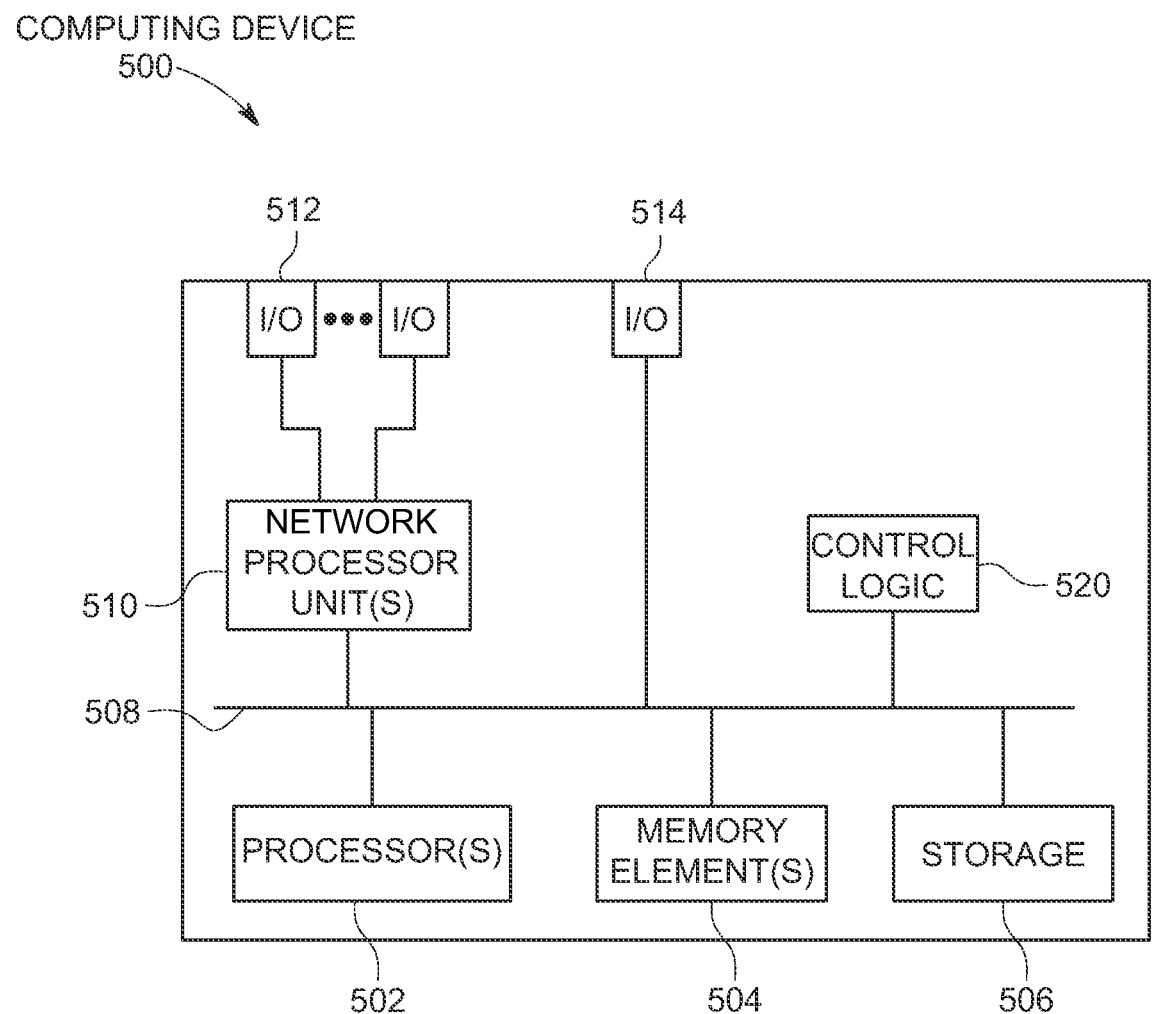
FIG. 5 is a hardware block diagram of a computing device that may perform functions associated with any combination of operations described herein.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s) and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information (wired and/or wireless) with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, techniques herein may provide for the ability to cater to the location of an IoT device, available access types for the location, and utilization of those access types and stream consumer preferences through the application of various intent/policy constructs that permit improved management of such consumer entitlements.

In one form, a computer-implemented method is provided that includes causing an Internet of Things (IoT) device to connect to a plurality of access networks based on a data stream policy; directing, based on the data stream policy, an IoT gateway to transmit a plurality of output data streams to a plurality of destinations, wherein the plurality of output data streams are based on a source data stream obtained by the IoT gateway from the IoT device via one or more of the plurality of access networks; determining a degradation for at least one access network of the plurality of access networks; and upon determining the degradation, causing a remediation action to be performed by at least one of the IoT device and the IoT gateway based on the data stream policy, wherein the remediation action includes, at least in part, limiting one or more of the plurality of output data streams that are transmitted to one or more of the plurality of destinations.

In one instance, the plurality of access networks include at least two of a wireless local area access network, a wireless wide area access network, and a cabled access network. In one instance, prior to determining the degradation, the IoT device communicates the source data stream to the IoT gateway via at least two access networks of the plurality of access networks. In one instance, causing the remediation action to be performed includes causing the IoT device to utilize a first access network of the at least two access networks as a primary access network to communicate the source data stream to the IoT gateway and to utilize a second access network of the at least two access networks as a backup access network, wherein the backup access network is not utilized unless a failure is determined for the primary access network.

In still one instance, causing the remediation action to be performed includes instructing the IoT gateway to suspend at least one output data stream from being transmitted to at least one destination of the plurality of destinations. In one instance, the data stream policy indicates a priority associated with each of the plurality of destinations in which at least one output data stream that is suspended is selected based on a particular priority associated with a particular destination.

In still one instance, causing the remediation action to be performed includes causing the IoT device to change a rate for transmitting the source data stream that is obtained by the IoT gateway. In one instance, to change the rate includes setting the rate to a particular rate of a plurality of rates based on the data stream policy and an extent of the degradation for at least one access network of the plurality of access networks. In still one instance, causing the remediation action to be performed includes causing the IoT device to stop including certain information in the source data stream.

In one instance, determining the degradation for the at least one access network includes one or more of: determining a failure of the at least one access network; and determining that a performance threshold for the at least one access network is breached.

In one instance, the method may further include determining a degradation in a capability of a particular destination of the plurality of destinations to obtain a particular output data stream from the IoT gateway; and instructing the IoT gateway to suspend the particular output data stream from being transmitted to the particular destination. In still one instance, the method may further include directing the IoT gateway to transmit the particular output data stream to another destination of the plurality of destinations.

In various instances, the plurality of destinations includes two or more of: one or more local data stores; one or more remote data stores; a manufacturer of the IoT device; and one or more leaseholders associated with the IoT device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    causing an Internet of Things (IoT) device to connect to a plurality of access networks based on a data stream policy, wherein the data stream policy is determined based on a type or classification of the IoT device and indicates, based on the type or classification of the IoT device, the plurality of access networks to which the IoT device is to connect until a degradation is determined for at least one access network of the plurality of access networks;
    directing, based on the data stream policy, an IoT gateway to transmit each of a plurality of output data streams to each of a plurality of destinations, wherein each output data stream of the plurality of output data streams is generated from a source data stream including data generated by the IoT device that is consumed by the IoT gateway from the IoT device via one or more access networks of the plurality of access networks, wherein each output data stream is generated based on at least one of an availability or a performance of the one or more access networks of the plurality of access networks;
    determining a degradation for at least one access network of the one or more access networks of the plurality of access networks based on at least one of the availability of the at least one access network or one or more performance thresholds for the at least one access network indicated by the data stream policy; and
    upon determining the degradation, causing a remediation action to be performed by at least one of the IoT device and the IoT gateway based on the data stream policy, wherein the remediation action includes, at least in part, limiting one or more of the plurality of output data streams that are transmitted to one or more of the plurality of destinations.

2. The method of claim 1, wherein the plurality of access networks include at least two of a wireless local area access network, a wireless wide area access network, and a cabled access network.

3. The method of claim 1, wherein prior to determining the degradation, the IoT device communicates the source data stream to the IoT gateway via at least two access networks of the plurality of access networks.

4. The method of claim 3, wherein causing the remediation action to be performed includes causing the IoT device to utilize a first access network of the at least two access networks as a primary access network to communicate the source data stream to the IoT gateway and to utilize a second access network of the at least two access networks as a backup access network, wherein the backup access network is not utilized unless a failure is determined for the primary access network.

5. The method of claim 1, wherein causing the remediation action to be performed includes instructing the IoT gateway to suspend at least one output data stream from being transmitted to at least one destination of the plurality of destinations, wherein the data stream policy indicates a priority associated with each of the plurality of destinations in which the at least one output data stream that is suspended is selected based on a particular priority associated with a particular destination.

6. The method of claim 1, wherein causing the remediation action to be performed includes causing the IoT device to change a rate for transmitting the source data stream that is obtained by the IoT gateway, wherein to change the rate includes setting the rate to a particular rate of a plurality of rates based on the data stream policy and an extent of the degradation for the at least one access network of the one or more access networks of the plurality of access networks.

7. The method of claim 1, wherein causing the remediation action to be performed includes causing the IoT device to stop transmitting certain information in the source data stream.

8. The method of claim 1, wherein determining the degradation for the at least one access network includes one or more of:
  determining a failure of the at least one access network; and
  determining that a performance threshold of the one or more performance thresholds for the at least one access network is breached.

9. The method of claim 1, further comprising:
  determining a degradation in a capability of a particular destination of the plurality of destinations to obtain a particular output data stream from the IoT gateway; and
  instructing the IoT gateway to suspend the particular output data stream from being transmitted to the particular destination.

10. The method of claim 9, further comprising:
  directing the IoT gateway to transmit the particular output data stream to another destination of the plurality of destinations.

11. The method of claim 1, wherein the plurality of destinations comprise two or more of:
  a local data store;
  a remote data store;
  a manufacturer of the IoT device; and
  a leaseholder associated with the IoT device.

12. The method of claim 1, further comprising: prior to causing the IoT device to connect to the plurality of access networks, identifying the type or classification of the IoT device; and determining the data stream policy for the IoT device based on the type or classification of the IoT device.

13. The method of claim 1, wherein the source data stream includes each of a first source data stream transmitted by the IoT device via a first access network corresponding to a first access technology type and a second data stream transmitted by the IoT device via a second access network corresponding to a second access technology type that is different than the first access technology type.

14. One or more non-transitory computer readable storage media encoded with instructions that, when executed by a processor, cause the processor to perform operations, comprising:
  causing an Internet of Things (IoT) device to connect to a plurality of access networks based on a data stream policy, wherein the data stream policy is determined based on a type or classification of the IoT device and indicates, based on the type or classification of the IoT device, the plurality of access networks to which the IoT device is to connect until a degradation is determined for at least one access network of the plurality of access networks;
  directing, based on the data stream policy, an IoT gateway to transmit each of a plurality of output data streams to each of a plurality of destinations, wherein each output data stream of the plurality of output data streams is generated from a source data stream including data generated by the IoT device that is consumed by the IoT gateway from the IoT device via one or more access networks of the plurality of access networks, wherein each output data stream is generated based on at least one of an availability or a performance of the one or more access networks of the plurality of access networks;
  determining a degradation for at least one access network of the one or more access networks of the plurality of access networks based on at least one of the availability of the at least one access network or one or more performance thresholds for the at least one access network indicated by the data stream policy; and
  upon determining the degradation, causing a remediation action to be performed by at least one of the IoT device and the IoT gateway based on the data stream policy, wherein the remediation action includes, at least in part, limiting one or more of the plurality of output data streams that are transmitted to one or more of the plurality of destinations.

15. The media of claim 14, wherein prior to determining the degradation, the IoT device communicates the source data stream to the IoT gateway via at least two access networks of the plurality of access networks and wherein causing the remediation action to be performed includes causing the IoT device to utilize a first access network of the at least two access networks as a primary access network to communicate the source data stream to the IoT gateway and to utilize a second access network of the at least two access networks as a backup access network, wherein the backup access network is not utilized unless a failure is determined for the primary access network.

16. The media of claim 14, wherein causing the remediation action to be performed includes instructing the IoT gateway to suspend at least one output data stream from being transmitted to at least one destination of the plurality of destinations.

17. The media of claim 14, wherein causing the remediation action to be performed includes causing the IoT device to change a rate for transmitting the source data stream that is obtained by the IoT gateway.

18. An apparatus comprising:
  at least one memory element for storing data; and
  at least one processor for executing instructions associated with the data, wherein executing the instructions causes the apparatus to perform operations, comprising:
  causing an Internet of Things (IoT) device to connect to a plurality of access networks based on a data stream policy, wherein the data stream policy is determined based on a type or classification of the IoT device and indicates, based on the type or classification of the IoT device, the plurality of access networks to which the IoT device is to connect until a degradation is determined for at least one access network of the plurality of access networks;

directing, based on the data stream policy, an IoT gateway to transmit each of a plurality of output data streams to each of a plurality of destinations, wherein each output data stream of the plurality of output data streams is generated from a source data stream including data generated by the IoT device that is consumed by the IoT gateway from the IoT device via one or more access networks of the plurality of access networks, wherein each output data stream is generated based on at least one of an availability or a performance of the one or more access networks of the plurality of access networks;

determining a degradation for at least one access network of the one or more access networks of the plurality of access networks based on at least one of the availability of the at least one access network or one or more performance thresholds for the at least one access network indicated by the data stream policy; and upon determining the degradation, causing a remediation action to be performed by at least one of the IoT device and the IoT gateway based on the data stream policy, wherein the remediation action includes, at least in part, limiting one or more of the plurality of output data streams that are transmitted to one or more of the plurality of destinations.

19. The apparatus of claim 18, wherein prior to determining the degradation, the IoT device communicates the source data stream to the IoT gateway via at least two access networks of the plurality of access networks and wherein causing the remediation action to be performed includes causing the IoT device to utilize a first access network of the at least two access networks as a primary access network to communicate the source data stream to the IoT gateway and to utilize a second access network of the at least two access networks as a backup access network, wherein the backup access network is not utilized unless a failure is determined for the primary access network.

20. The apparatus of claim 18, wherein causing the remediation action to be performed includes instructing the IoT gateway to suspend at least one output data stream from being transmitted to at least one destination of the plurality of destinations.

\* \* \* \* \*